(12) United States Patent
Kimura

(10) Patent No.: US 7,339,775 B2
(45) Date of Patent: Mar. 4, 2008

(54) OVERCURRENT PROTECTION CIRCUIT AND DC POWER SUPPLY

(75) Inventor: Hiroyuki Kimura, Miyagi (JP)

(73) Assignee: Freescale Semiconductor, Inc., Austin, TX (US)

( * ) Notice: Subject to any disclaimer, the term of this patent is extended or adjusted under 35 U.S.C. 154(b) by 315 days.

(21) Appl. No.: 11/300,076

(22) Filed: Dec. 14, 2005

(65) Prior Publication Data

US 2006/0133000 A1    Jun. 22, 2006

(30) Foreign Application Priority Data

Dec. 20, 2004    (JP)    ............... 2004-368392

(51) Int. Cl.
*H02H 9/08*    (2006.01)
(52) U.S. Cl. ..................... 361/93.1; 361/93.9
(58) Field of Classification Search .............. 361/93.1, 361/93.7, 93.8, 93.9
See application file for complete search history.

(56) References Cited

FOREIGN PATENT DOCUMENTS

| | | |
|---|---|---|
| JP | 5-326679 | 12/1993 |
| JP | 7-182055 | 7/1995 |
| JP | 9-262540 | 10/1997 |
| JP | 11-103524 | 4/1999 |
| JP | 2000-363981 | 2/2000 |
| JP | 2002-169618 | 6/2002 |

*Primary Examiner*—Michael Sherry
*Assistant Examiner*—Danny Nguyen
(74) *Attorney, Agent, or Firm*—Charles Bergere

(57) ABSTRACT

An overcurrent protection circuit and DC power supply that are subtly affected by process and device differences, have small input and output voltage drops, and set maximum and short-circuit current values. In a normal operation mode, a first operational amplifier and an output transistor keep the output voltage constant. In a current limiting mode, when a large current is input to an input terminal due to transient response, a second detection transistor and a third operational amplifier control a second control transistor to keep the maximum current of the output transistor constant. When voltage decreases during a foldback mode, a first detection transistor and a second operational amplifier control a first control transistor to control short-circuit current of the output transistor. A second operational amplifier decreases output current in accordance with the output voltage with a current source that maintains constant mutual conductance.

5 Claims, 5 Drawing Sheets

OVERCURRENT PROTECTION CIRCUIT AND DC POWER SUPPLY

BACKGROUND OF THE ART

The present invention relates to an overcurrent protection circuit for preventing overcurrent by limiting output current to be less than or equal to a predetermined value.

In many cases, a conventional constant voltage circuit includes an overcurrent protection circuit just in case the output terminal of the constant voltage circuit short-circuits. When the output current from the output terminal becomes greater than or equal to a predetermined value, an overcurrent protection circuit of one type interrupts the output, an overcurrent protection circuit of another type locks the output to prevent the output current from increasing anymore, and an overcurrent protection circuit of a further type gradually reduces the output voltage and the output current. For the circuit that interrupts the output, an operation to recover the interrupted output is required. For the circuit that permits continuous flow of a peak current, its output transistor is adversely affected when the peak current, at which the overcurrent protection operation is started, is set at a large value. Further, the output is not sufficiently large when the peak current is set at a small value.

The circuit that gradually reduces the output current has a foldback voltage-current characteristic, and is called a foldback current limiting circuit. In the foldback current limiting circuit, the output voltage starts decreasing and the output current also starts decreasing when the current value reaches a peak current value. The value of a short-circuit current is smaller than the peak current value when the voltage of the output terminal is zero. As a result, when the horizontal axis represents current and the vertical axis represents voltage, the voltage-current relationship shows a foldback characteristic. An overcurrent protection circuit having such a foldback voltage-current characteristic ensures protection of the output transistor and enables the current amount when the overcurrent protection operation is started to be relatively large. This enables the output to be increased.

A technique relating to a stabilizing power supply circuit, which has a foldback current-voltage characteristic and sets a small output current when a ground fault occurs in the output, has been proposed to reduce heat loss and enable the circuit to be easily realized by an integrated circuit (refer to, for example, Japanese Laid-Open Patent Publication No. 7-182055). The circuit described in this publication is shown in correspondence with the present invention in FIG. 4. The stabilizing power supply circuit includes an output transistor and a current detection resistor, which are connected between an input terminal and an output terminal. The stabilizing power supply circuit further includes an error amplifier and a first output control transistor for comparing the voltage of the output terminal with a reference voltage and controlling the output transistor. The stabilizing power supply circuit further includes a comparator and a second output control transistor for detecting the voltages at the two terminals of the current detection resistor and controlling the output transistor. In this way, the stabilizing power supply circuit separately sets the overcurrent detection point and the output current when a ground fault occurs in the output terminal. This reduces the power consumed by the output transistor when a ground fault occurs in the output terminal and prevents heat generation or breakage of the circuit, which would be caused by a fault occurring in the output terminal.

A technique relating to an overcurrent protection circuit that does not have a current detection resistor on its output path has been proposed (refer to, for example, Japanese Laid-Open Patent Publication No. 11-103524). The circuit described in this publication is shown in correspondence with the present invention in FIG. 5. This overcurrent protection circuit includes an output transistor for outputting current supplied to a load, a drive transistor for controlling the amount of current flowing through the output transistor, and a feedback means for controlling the drive transistor in accordance with the value of output voltage supplied to the load. The overcurrent protection circuit detects current corresponding to the current flowing through the load. When the detected current is greater than or equal to a predetermined value, the overcurrent protection circuit controls the drive transistor to limit the output current of the output transistor. In this way, the overcurrent protection circuit directly controls the current of the drive transistor in accordance with the detected current value. This configuration enables the overcurrent protection function to be realized using an independent reference voltage. Thus, the overcurrent protection function is less dependent on the voltage of the transistor, the input voltage, and the output voltage. Further, the overcurrent protection circuit does not required a current detection resistor to be arranged in its current path that leads to the output terminal, and a current mirror circuit may be arranged in a path through which current proportional to the output current flows.

A technique relating to a constant voltage power supply circuit, which enable its overcurrent limiting function with respect to overload and its short-circuit current limiting function with respect to output short-circuiting to be set freely in a manner independent of each other, has been proposed (refer to, for example, Japanese Laid-Open Patent Publication No. 2002-169618). The circuit described in this publication is shown in correspondence with the present invention in FIG. 6. In the constant voltage power supply circuit, an output transistor is controlled based on the output of an error amplifier. Load current is detected by a current detection circuit. Voltage generated based on the detected load current and the output of a voltage detection circuit detecting output voltage are input into a comparator having an offset. Then, the output transistor is controlled based on the output of the comparator.

In the circuit according to the technique described in Japanese Laid-Open Patent Publication No. 7-182055, the resistor, which detects the current, consumes much power. If current is decreased, detection would become difficult. When detecting current with a resistor, the resistance would have to be accurate. However, it is difficult to manufacture a small resistor having a precise absolute value during a semiconductor fabrication process. From this viewpoint, it would be difficult for the circuit described in Japanese Laid-Open Patent Publication No. 7-182055 to be realized by an integrated circuit.

In the circuit described in Japanese Laid-Open Patent Publication No. 11-103524, it may be difficult to detect short-circuit current depending on the voltage condition or changes in the environment in which the detection transistor. Further, the value of the short-circuit current, which is determined using the absolute value of the resistor, may greatly differ depending on the resistance of the resistor.

Likewise, in the circuit in Japanese Laid-Open Patent Publication No. 2002-169618, it may be difficult to detect short-circuit current depending on the voltage condition or changes in the environment in which the detection transistor. Further, the value of the short-circuit current changes when the threshold voltage of the transistor and the resistance of the resistor change.

SUMMARY OF THE INVENTION

It is an object of the present invention to provide an overcurrent protection circuit and a DC power supply, which are subtly affected by fabrication processes differences between devices, which have small drops in input and output voltages, and which enable the setting of a maximum current value and a short-circuit current value.

One aspect of the present invention is an overcurrent protection circuit provided with an output control device including a control terminal for controlling power between an input terminal and an output terminal of the overcurrent protection circuit. A first comparator, connected to the control terminal of the output control device, compares a reference voltage with voltage of the output terminal and outputs a comparison result. First and second detection devices, each of which includes a control terminal sharing the comparison result, detect a proportional current value that is proportional to current flowing through the output control device. A second comparator, connected to an output terminal of the first detection device, compares the proportional current value with a first reference current value provided by a first current source. A first control device, connected to an output terminal of the second comparator, controls voltage of the control terminal of the output control device. A second current source, connected to an output terminal of the second detection device, provides a second reference current value. A third comparator compares voltage of the output terminal of the second detection device with voltage of an output terminal of the output control device. A second control device, connected to an output terminal of the third comparator, controls voltage of the control terminal of the output control device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Figure 1:
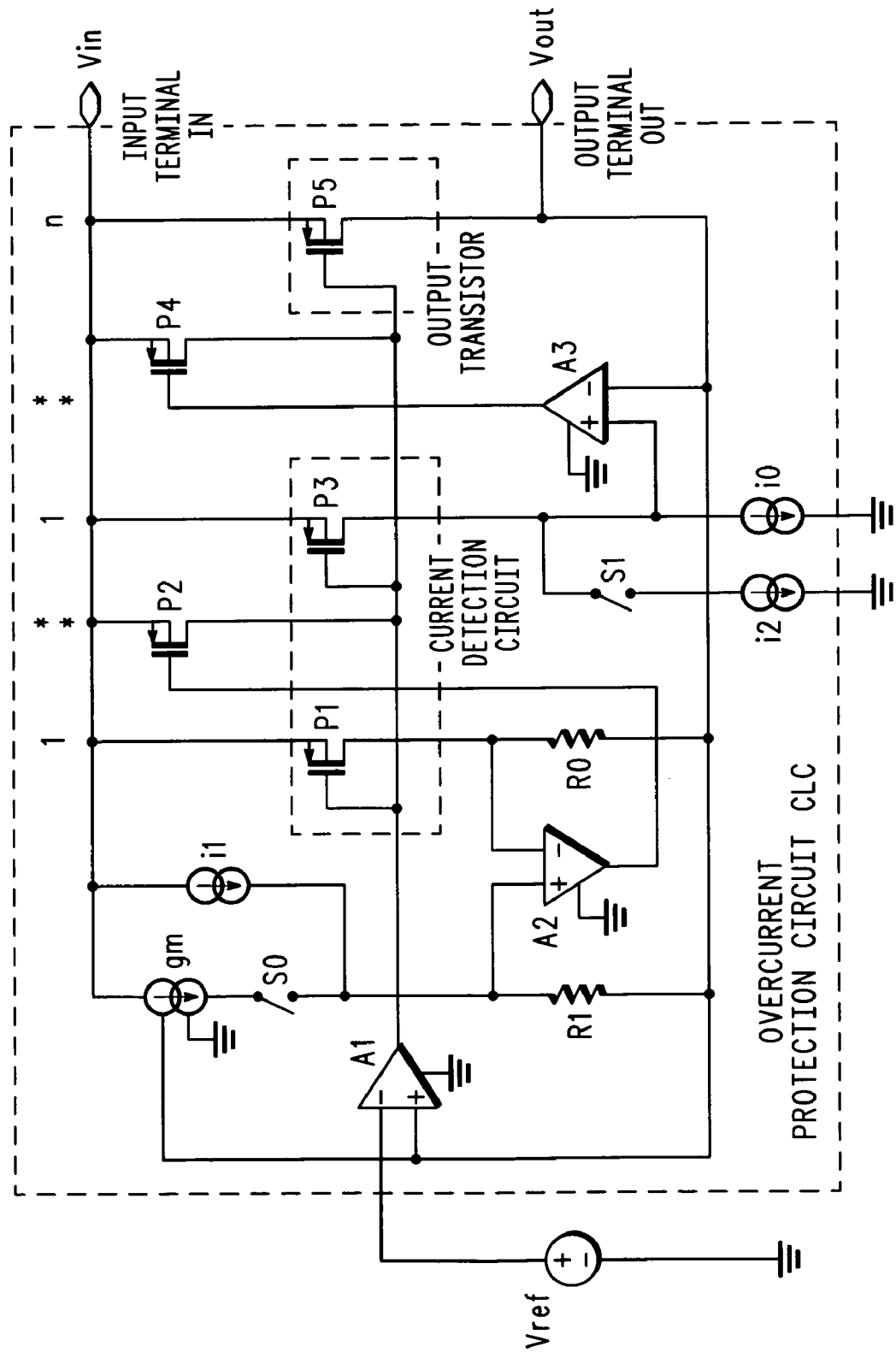
FIG. 1 is a circuit diagram of an overcurrent protection circuit according to a preferred embodiment of the present invention.

An overcurrent protection circuit CLC having a P-channel MOS (metal oxide semiconductor) configuration according to a first embodiment of the present invention will now be described with reference to FIG. 1. The overcurrent protection circuit CLC includes an input terminal IN, to which an input voltage Vin is applied, and an output terminal OUT, to which an output voltage Vout is applied. The overcurrent protection circuit CLC includes an output transistor P5, which functions as an output control device and which is arranged between the input terminal IN and the output terminal OUT. The input voltage Vin input to the input terminal IN is output from the output terminal OUT via the output transistor P5. Output current Iout is determined by a load connected to the output terminal OUT.

The output terminal OUT is further connected to a positive input terminal of an operational amplifier A1, which functions as a first comparator. Reference voltage Vref is input to a negative input terminal of the operational amplifier A1. An output terminal of the operational amplifier A1 is connected to a gate terminal (control terminal) of the output transistor P5.

A current detection circuit is further connected to the gate terminal of the output transistor P5. More specifically, the current detection circuit comprises a transistor P1, which functions as a first detection device, and a transistor P3, which functions as a second detection device. The gates of the transistors P1 and P3 are connected to a line connecting the output terminal of the operational amplifier A1 and the gate terminal of the output transistor P5.

The transistor P3 has a source terminal connected to the input terminal IN and a drain terminal connected to current sources i0 and i2, which function as a second current source. The current source i0 has a second current value, and the current sources i2 has a third current value. A switch S1 is arranged between the drain terminal of the transistor P3 and the current source i2. In a normal mode, the switch S1 is closed. The switch S1 operates in cooperation with a switch S0, which will be described later. The switch S1 and the switch S0 function as a switch unit.

Further, a positive input terminal of an operational amplifier A3, which functions as a second comparator, is connected between the drain terminal of the transistor P3 and the current source i0. A negative input terminal of the operational amplifier A3 is connected to the output terminal OUT. An output terminal of the operational amplifier A3 is connected to the gate terminal of a transistor P4, which functions as a second control device. The transistor P4 has a source terminal connected to the input terminal IN and a drain terminal connected to the gate terminal of the output transistor P5.

The transistor P1 has a source terminal connected to the input terminal IN and a drain terminal connected to the output terminal OUT via a resistor R0. Further, the drain terminal of the transistor P1 is connected to a negative input terminal of an operational amplifier A2. A positive input terminal of the operational amplifier A2 is connected to a current source gm and a current source i1, which function as a first current source. The current sources gm and i1 are connected to the output terminal OUT via a resistor R1. The current source i1 has a first current value, and the current source gm has a current value that maintains constant mutual conductance. The switch S0 is connected to the current source gm. In the normal mode, the switch S0 is closed. The current supplied by the current source i1 and the current supplied by the current source i0 are determined in accordance with the size ratio of the transistor P1 and the transistor P3 so that current controlled by the operational amplifier A2 and a transistor P2 (in a "foldback mode" described later) and current controlled by the operational amplifier A3 and the transistor P2 (in a "current limiting mode" described later) are smoothly connected. In this embodiment, the size ratio of the transistor P1 and the transistor P3 is set to 1:1. When R0=R1 is satisfied, the current source i1 and the current source i0 that are used supply the same current. In the same manner, the maximum value of the control current supplied by the current source gm is equalized with the current supplied by the current source i2.

An output terminal of the operational amplifier A2 is connected to a gate terminal of the transistor P2, which functions as a first control device. The transistor P2 has a source terminal connected to the input terminal IN and a drain terminal connected to the gate terminal of the output transistor P5.

In this embodiment, P-channel MOS transistors are used as the transistor P1, the transistor P3, and the output transistor P5. The size ratio of the transistor P1, the transistor P3, and the output transistor P5 is set to 1:1:n. The transistor P1 and the transistor P3 detect a proportional current value that is proportional to the current flowing through the output transistor P5. Further, P-channel MOS transistors are used as the transistor P2 and the transistor P4. In this embodiment, the source terminal of each transistor functions as an input terminal, and the drain terminal of each transistor functions as an output terminal.

The operation of the overcurrent protection circuit CLC will now be discussed. The circuit operation will be described in the order of normal operation mode, current limiting mode, foldback mode, and charge mode.

Normal Operation Mode

Figure 2:
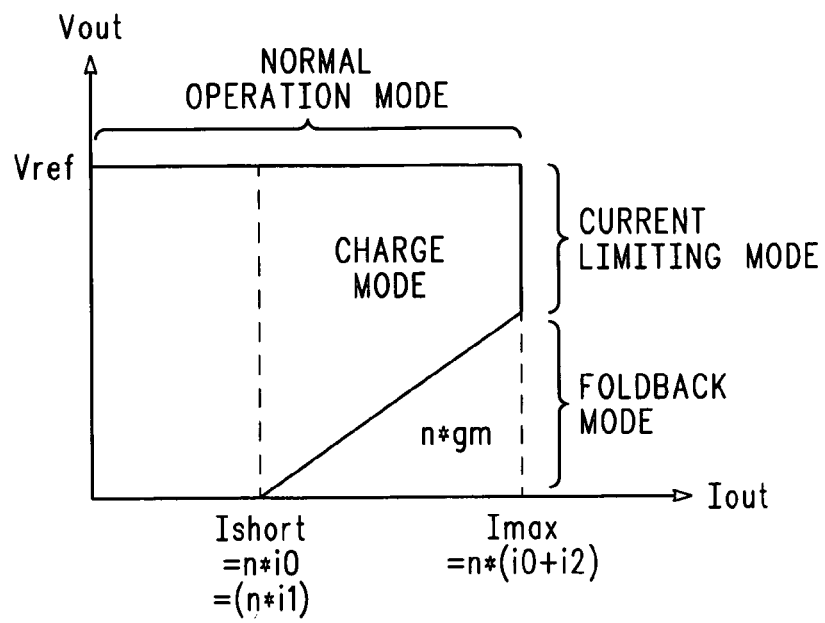
FIG. 2 is a graph showing the current-voltage characteristic of the overcurrent protection circuit of the preferred embodiment.
Figure 4:
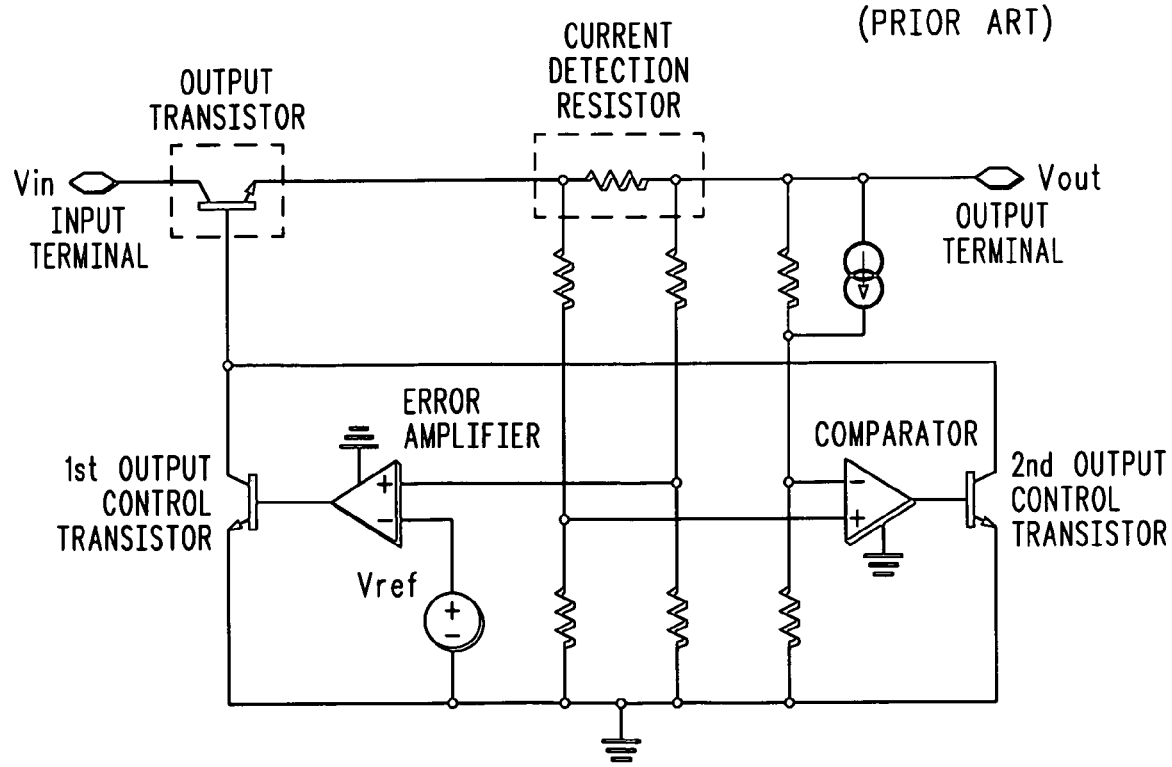
FIG. 4 is a circuit diagram of a circuit in the prior art.

In the normal operation mode, the operational amplifier A1 and the output transistor P5 are operated. More specifically, the operational amplifier A1 compares the output voltage Vout of the output terminal OUT with the reference voltage Vref, and inputs the comparison result to the gate terminal of the output transistor P5. This controls the output transistor P5 so that the output voltage Vout is equal to the reference voltage Vref. As a result, an operation range satisfying Vout=Vref is formed as shown in FIG. 2.

Current Limiting Mode

The current limiting mode is set when a large current is input to the input terminal IN during the normal operation mode. In the first embodiment, the size ratio of the transistor P3 and the output transistor P5 is set to 1:n, as described above. Thus, the transistor P3 detects 1/n of the output current Iout that flows through the output transistor P5. If the switch S1 closed, the operational amplifier A3 controls the transistor P4 to be off when the output current Iout flowing through the output transistor P5 is less than or equal to n*(i0+i2) based on a second reference current value (i0+i2).

When the output current Iout flowing through the output transistor P5 exceeds n*(i0+i2), the operational amplifier A3 controls the current flowing through the transistor P4 to limit the current flowing through the output transistor P5. More specifically, the operational amplifier A3 first lowers the gate voltage of the transistor P4. This raises the gate voltage of the output transistor P5. As a result, the output transistor P5, which is a P-channel MOS transistor, adjusts the maximum current Imax to be n*(i0+i2).

The operational amplifier A3 maintains the drain voltage of the transistor P3 at the same potential as the drain voltage of the output transistor P5. This enables the ratio of the currents flowing through the two transistors to constantly be 1:n irrespective of the drop voltage. As a result, the maximum current Imax is adjusted to be constant in the range of the operational voltages of the current sources (i0 and i2) and the operational amplifier A3. This forms the operation range of the current limiting mode, as shown in FIG. 2.

Foldback Mode

Next, the foldback mode will be described. The foldback mode is set when the voltage further decreases in the current limiting mode. In this embodiment, the size ratio of the transistor P1 and the output transistor P5 is set to 1:n. Thus, the transistor P1 detects 1/n of the output current Iout that flows through the output transistor P5.

Accordingly, voltage of Vout+R0*Iout/n is applied to the negative input terminal of the operational amplifier A3.

If the switch S0 is closed, voltage of Vout+R1*(i1+gm) is applied to the positive input terminal of the operational amplifier A3 based on a first reference current value (i1+gm), which is the sum of the first current value and the control current value maintaining constant mutual conductance.

When R0*Iout/n<R1*(i1+gm) is satisfied, the operational amplifier A2 controls the transistor P2 to be off.

When R0*Iout/n>R1*(i1+gm) is satisfied, the operational amplifier A2 controls the current flowing through the transistor P2 to satisfy Iout/n*R0=R1*(i1+gm).

As a result, the output current Iout becomes equal to (i1+gm)*n*R1/R0.

The current source gm supplies current proportional to the output voltage Vout. The maximum value of the current source gm is i2*R0/R1. Thus, when the output voltage Vout is zero, that is, when short-circuiting occurs, the current supplied from the current source gm is zero. In this case, the operational amplifier A2 controls the transistor P2 so as to satisfy Iout (=Ishort)=n*i1*R1/R0(=n*i0).

In this operation mode, the voltage generated at the resistor R0 is smaller than the source-drain voltage VDS of the transistor P1. Thus, the transistor P1 and the output transistor P5 have substantially the same source-drain voltage VDS. As a result, the transistor P1 and the output transistor P5 maintain the current ratio of 1:n. This forms the operation range of the foldback mode, as shown in FIG. 2.

Charge Mode

If the load is a capacitor load, when power is turned on or when the setting of the voltage Vref is changed, the power supply current needs to be prevented from becoming excessive. Thus, the charge mode is set by opening the switch S0 and the switch S1. In this case, the maximum current Imax is limited to n*i0.

The current source gm is disconnected. Thus, the operational amplifier A2 controls the output current so that Iout (=Ishort) becomes equal to n*i0. In the same manner, the operational amplifier A3 controls the output current so that Iout (=Ishort) becomes equal to n*i0. As a result, the foldback mode is not set, and the operation range of the charge mode is formed as shown in FIG. 2.

This embodiment has the advantages described below.

In this embodiment, the input is output via the output transistor P5 during the normal operation mode. The output transistor P5 is controlled by the operational amplifier A1, and the output voltage is fed back to the operational amplifier A1. Thus, the internal resistance viewed from the output side is lowered. With this configuration, the drop voltage of the output transistor P5 is lowered by the output transistor P5, which is sufficiently large with respect to the output current. Thus, this section consumes less power. Further, a P-channel MOS transistor is used as the output transistor P5 in this embodiment. Thus, another power supply for turning on the output transistor P5 is not necessary. If an N-channel MOS transistor is used as the output transistor, potential that is greater than the input voltage Vin becomes necessary to control the output transistor. In this manner, the internal resistance is lowered to reduce power consumption.

In this embodiment, the current detection circuit is connected to the gate terminal of the output transistor P5. The output transistor P5 controls the output current Iout and the output voltage Vout via the transistors P1 and the transistor P3. These transistors comprise P-channel MOS transistors. Accordingly, the overcurrent protection circuit may easily be manufactured during a normal semiconductor fabrication process.

In this embodiment, when the output current Iout of the output transistor P5 exceeds n*(i0+i2) during the current limiting mode, the operational amplifier A3 controls the current flowing through the transistor P4 to limit the current flowing through the output transistor P5. This adjusts the maximum current Imax to be equal to n*(i0+i2). The operational amplifier A3 maintains the drain voltage of the transistor P3 at the same potential as the drain voltage of the output transistor P5. This enables the ratio of the currents flowing through the two transistors to constantly be 1:n irrespective of the drop voltage. As a result, the maximum current Imax is adjusted to be constant within the range of the operational voltages of the current sources i0 and i2 and the operational amplifier A3.

In this embodiment, the transistor P1 detects 1/n of the output current Iout that flows through the output transistor P5 during the foldback mode. The detected current is then compared with the current supplied from the current sources (i1 and gm), and the transistor P2 is controlled in accordance with the comparison result. The current source gm supplies current proportional to the output voltage Vout. The maximum value of the current supplied by the current source gm is i2*R0/R1. This enables the output current Iout to become equal to the short-circuit current Ishort=n*i0 when the output is short-circuited.

In this embodiment, the switches (S1 and S0) are connected to the current sources (i2 and gm), respectively. The charge mode is set by opening the switches. When the load is a capacitor load or when the reference voltage Vref is set at a large value to increase the output voltage, the overcurrent protection circuit realizes a characteristic that does not set the foldback mode.

In this embodiment, each current source is a current mirror circuit. This easily acts as the overcurrent protection circuit with semiconductor devices.

Second Embodiment

Figure 3:
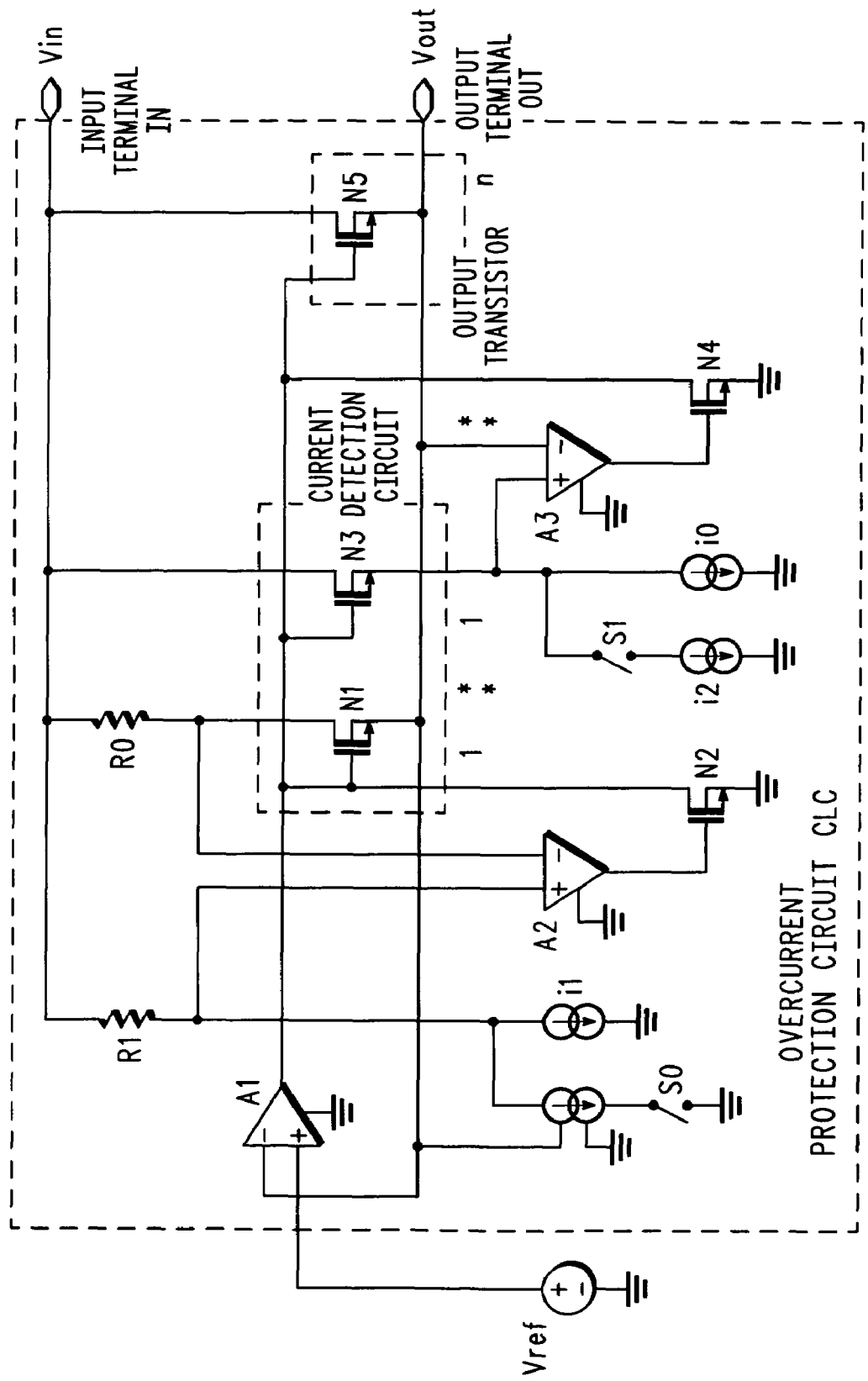
FIG. 3 is a circuit diagram of an overcurrent protection circuit according to a further embodiment of the present invention.
Figure 5:
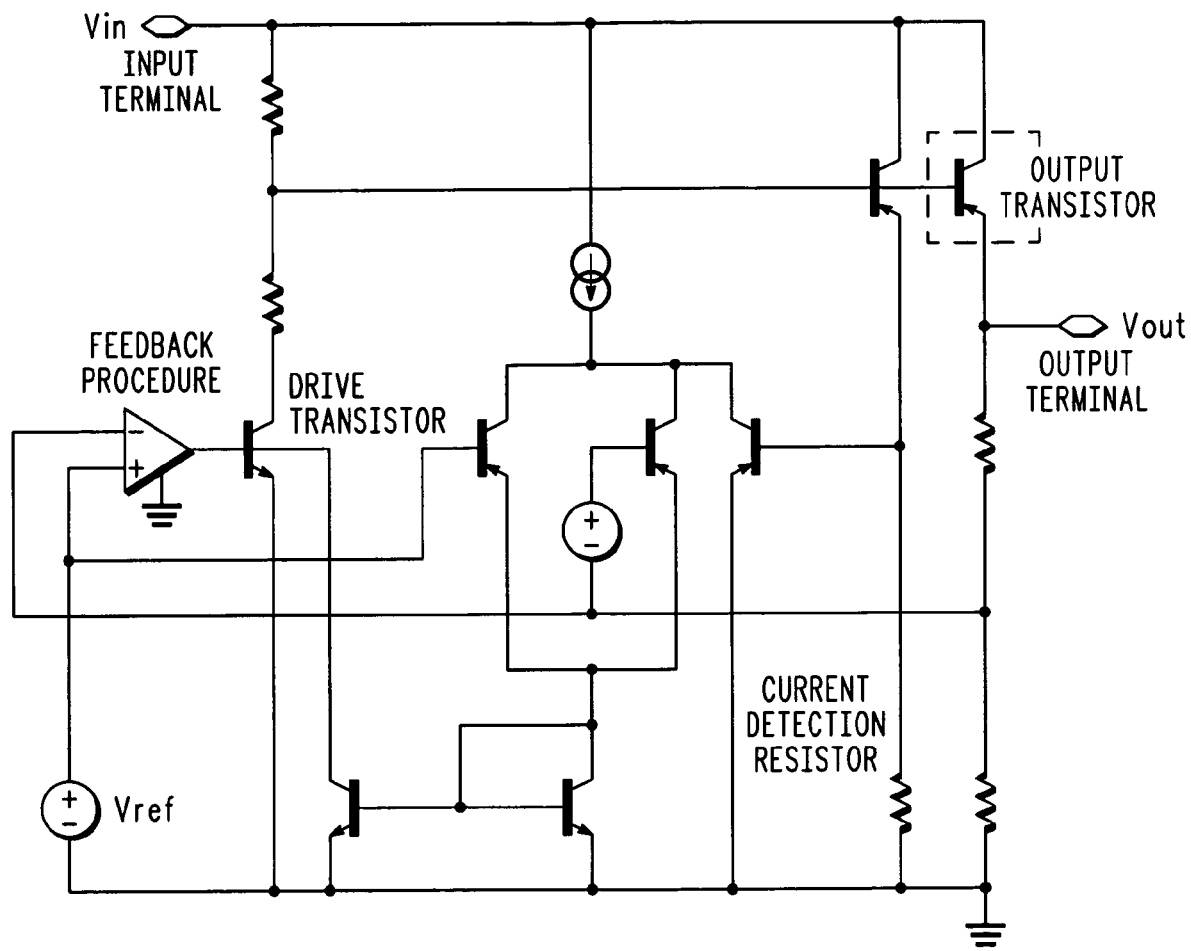
FIG. 5 is a circuit diagram of a circuit in the prior art.
Figure 6:
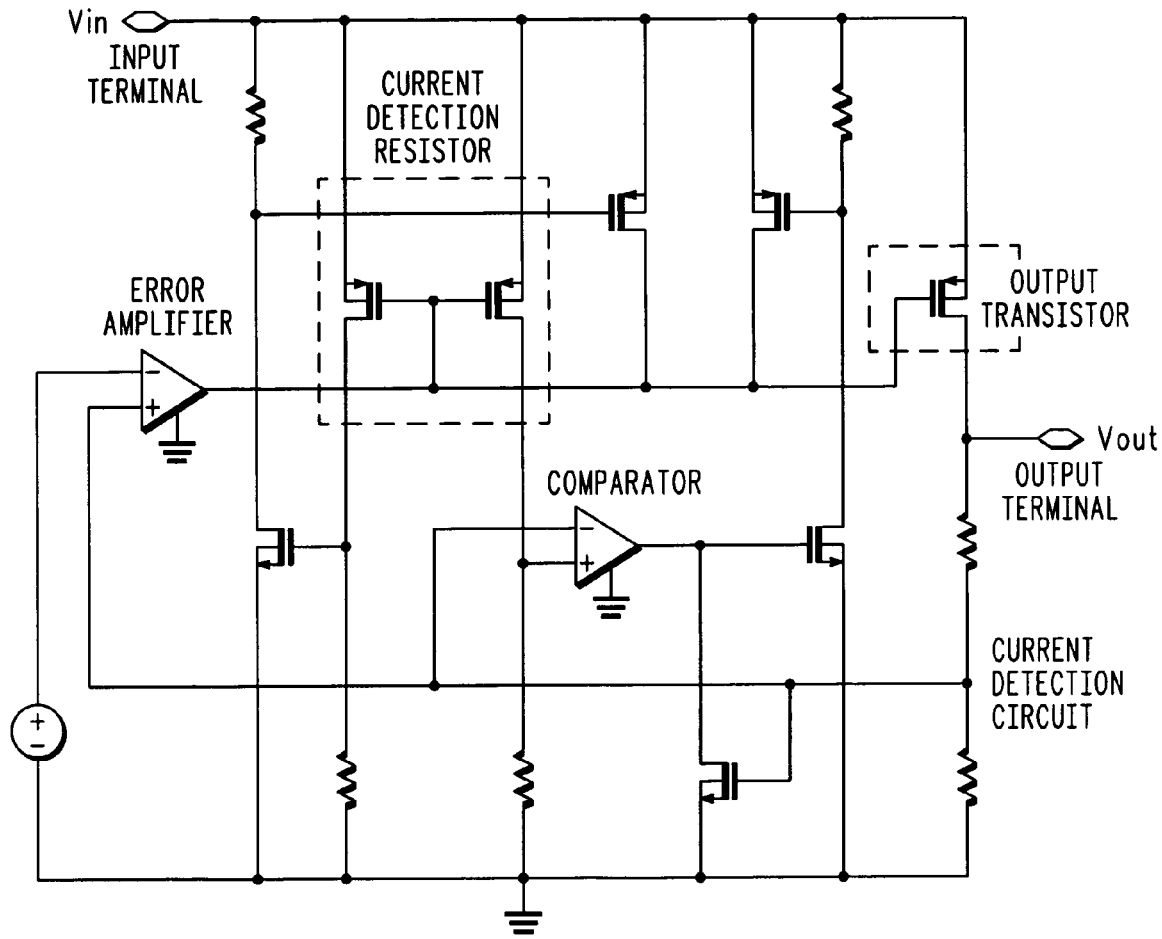
FIG. 6 is a circuit diagram of a circuit in the prior art.

An overcurrent protection circuit CLC having an N-channel MOS configuration according to a second embodiment of the present invention will now be described with reference to FIG. 3. The overcurrent protection circuit CLC includes an input terminal IN, to which an input voltage Vin is applied, and an output terminal OUT, to which an output voltage Vout is applied. The overcurrent protection circuit CLC includes an output transistor N5, which is arranged between the input terminal IN and the output terminal OUT. The input voltage Vin input to the input terminal IN is output from the output terminal OUT via the output transistor N5. The output current Iout is determined by a load connected to the output terminal OUT.

The output terminal OUT is further connected to a positive input terminal of an operational amplifier A1. A reference voltage Vref is input to a negative input terminal of the operational amplifier A1. An output terminal of the operational amplifier A1 is connected to the gate terminal of the output transistor N5.

A current detection circuit is further connected to the gate terminal of the output transistor N5. More specifically, the current detection circuit comprises a transistor N1 and a transistor N3. The gate terminals of the transistors N1 and N3 are connected to a line connecting the output terminal of the operational amplifier A1 and the gate terminal of the output transistor N5.

The transistor N3 has a drain terminal connected to the input terminal IN and a source terminal connected to current sources i0 and i2. A switch S1 is arranged between the source terminal of the transistor N3 and the current source i2. In a normal mode, the switch S1 is closed. Further, a positive input terminal of an operational amplifier A3 is connected between the source terminal of the transistor N3 and the current source i0. The output terminal OUT is connected to a negative input terminal of the operational amplifier A3. An output terminal of the operational amplifier A3 is connected to the gate terminal of a transistor N4. The transistor N4 has a source terminal that is grounded and a drain terminal connected to the gate terminal of the output transistor N5.

The transistor N1 has a drain terminal connected to the input terminal IN and a source terminal connected to the input terminal IN via a resistor R0. Further, the drain terminal of the transistor N1 is connected to a negative input terminal of an operational amplifier A2. A positive input terminal of the operational amplifier A2 is connected to a current source gm and a current source i1. The current sources gm and i1 are connected to the input terminal IN via the resistor R1. A switch S0 is connected to the current source gm. In the normal mode, the switch S0 is closed. The current supplied by the current source i1 and the current supplied by the current source i0 are determined in accordance with the size ratio of the transistor N1 and the transistor N3 so that current controlled by the operational amplifier A2 and a transistor N2 (in a "foldback mode") and current controlled by the operational amplifier A3 and the transistor N2 (in a "current limiting mode") are smoothly connected. In this embodiment, the size ratio of the transistor N1 and the transistor N3 is set to 1:1. When R0=R1 is satisfied, the current source i1 and the current source i0 that are used supply the same current. In the same manner, the maximum value of the control current supplied by the current source gm is equalized with the current supplied by the current source i2.

The output terminal of the operational amplifier A2 is connected to the gate terminal of the transistor N2. The transistor N2 has a source terminal that is grounded and a drain terminal connected to the gate terminal of the output transistor N5.

In this embodiment, N-channel MOS transistors are used as the transistor N1, the transistor N3, and the output transistor N5. The size ratio of the transistor N1, the transistor N3, and the output transistor N5 is set to 1:1:n. Further, N-channel MOS transistors are used as the transistor N2 and the transistor N4.

In the same manner as in the first embodiment, the input is output via the output transistor N5 during the normal operation mode in this embodiment. Thus, the internal resistance is lowered and the power consumption is reduced. Further, the operation of the operational amplifier A1 keeps the output voltage Vout equal to the reference voltage Vref.

In the same manner as in the first embodiment, the operational amplifier A3 controls the current flowing through the transistor N4 to limit the current flowing through the output transistor N5 in the current limiting mode when the output current Iout of the output transistor N5 exceeds n*(i0+i2) so that the maximum current Imax is adjusted to n*(i0+i2). The operational amplifier A3 maintains the source voltage of the transistor N3 at the same potential as the source voltage of the output transistor N5. This enables the ratio of the currents flowing through the two transistors to constantly be 1:n irrespective of the drop voltage. As a result, the maximum current Imax is adjusted to be constant within the range of operational voltages of the current sources i0 and i2 and the operational amplifier A3.

In the same manner as in the first embodiment, the transistor N1 detects 1/n of the output current Iout flowing through the output transistor N5 in the foldback mode. The detected current is then compared with the current supplied from the current sources (i1 and gm), and the transistor N2 is controlled in accordance with the comparison result. The current source gm supplies current proportional to the output voltage Vout. The maximum value of the current supplied by the current source gm is i2*R0/R1. This enables the output current Iout to become equal to the short-circuit current Ishort=n*i0 when the output is short-circuited.

In the same manner as in the first embodiment, the switches (S1 and S0) are connected to the current sources (i2 and gm), respectively. The charge mode is set by opening the switches. When the load is a capacitor load, the power is turned on, or the setting of the reference voltage Vref is changed, the foldback mode is not set and the power supply current is prevented from becoming unnecessarily excessive.

In this embodiment, the current detection circuit is connected to the gate terminal of the output transistor N5, and the output current Iout and the output voltage Vout are controlled via the transistor N1 and the transistor N3. These transistors comprise N-channel MOS transistors. Accordingly, the overcurrent protection circuit may easily be manufactured during a normal semiconductor fabrication process using N-channel MOS transistors.

It should be apparent to those skilled in the art that the present invention may be embodied in many other specific forms without departing from the spirit or scope of the invention. Particularly, it should be understood that the present invention may be embodied in the following forms.

In the above embodiments, an external power supply is arranged outside the overcurrent protection circuit CLC. However, a voltage supply may be incorporated to form a DC power supply.

The present examples and embodiments are to be considered as illustrative and not restrictive, and the invention is not to be limited to the details given herein, but may be modified within the scope and equivalence of the appended claims.

What is Claimed is:

1. An overcurrent protection circuit, comprising:
    an output control device including a control terminal for controlling power between an input terminal and an output terminal of the overcurrent protection circuit;
    a first comparator, connected to the control terminal of the output control device, for comparing a reference voltage with a voltage of the output terminal of the overcurrent protection circuit and outputting a comparison result;
    first and second detection devices, each of which includes a control terminal that receives the comparison result, for detecting a proportional current value that is proportional to current flowing through the output control device;
    a second comparator, connected to an output terminal of the first detection device, for comparing the proportional current value with a first reference current value provided by a first current source;
    a first control device, connected to an output terminal of the second comparator, for controlling a voltage of the control terminal of the output control device;
    a second current source, connected to an output terminal of the second detection device, for providing a second reference current value;
    a third comparator for comparing a voltage of the output terminal of the second detection device with a voltage of an output terminal of the output control device; and
    a second control device, connected to an output terminal of the third comparator, for controlling a voltage of the control terminal of the output control device.

2. The overcurrent protection circuit according to claim 1, wherein:
    the first current source comprises current sources providing a first current value and a control current value that maintains constant mutual conductance;
    the second current source comprises current sources providing a second current value and a third current value; and
    the first current value is equalized with the second current value, and a maximum value of the control current value is equalized with the third current value.

3. The overcurrent protection circuit according to claim 2, further comprising:
    a switch unit for cooperatively disconnecting the current source providing the control current value that maintains the mutual conductance and the current source providing the second current value.

4. The overcurrent protection circuit according to claim 1, wherein the reference voltage is variable.

5. A direct current power supply, comprising:
    an overcurrent protection circuit having an input terminal and an output terminal, the protection circuit including,
    an output control device including a control terminal for controlling power between the input and output terminals of the overcurrent protection circuit;
    a first comparator, connected to the control terminal of the output control device, for comparing a reference voltage with a voltage of the output terminal of the overcurrent protection circuit and outputting a comparison result;
    first and second detection devices, each of which includes a control terminal that receives the comparison result, for detecting a proportional current value that is proportional to current flowing through the output control device;
    a second comparator, connected to an output terminal of the first detection device, for comparing the proportional current value with a first reference current value provided by a first current source;

a first control device, connected to an output terminal of the second comparator, for controlling a voltage of the control terminal of the output control device;

a second current source, connected to an output terminal of the second detection device, for providing a second reference current value;

a third comparator for comparing a voltage of the output terminal of the second detection device with a voltage of an output terminal of the output control device; and a second control device, connected to an output terminal of the third comparator, for controlling a voltage of the control terminal of the output control device; and a voltage supply connected to the input terminal of the overcurrent protection circuit.

* * * * *